United States Patent [19]

Hendrickson

[11] Patent Number: 4,822,077
[45] Date of Patent: Apr. 18, 1989

[54] PIPE COUPLING REDUCING INSERT

[75] Inventor: Thomas R. Hendrickson, Pontiac, Mich.

[73] Assignee: Urdan Industries (USA) Inc., Southfield, Mich.

[21] Appl. No.: 248,914

[22] Filed: Sep. 26, 1988

[51] Int. Cl.[4] .......................................... F16L 25/00
[52] U.S. Cl. .................................. 285/12; 285/112; 285/177; 285/373
[58] Field of Search ............... 285/12, 112, 373, 419, 285/177

[56] References Cited

U.S. PATENT DOCUMENTS

| 1,683,076 | 9/1928 | Johnson et al. | 285/112 |
| 3,680,894 | 8/1972 | Young | 285/177 X |
| 3,977,705 | 8/1976 | Thiessen | 285/112 |

FOREIGN PATENT DOCUMENTS

| 786558 | 9/1935 | France | 285/177 |
| 336107 | 3/1959 | Switzerland | 285/177 |
| 2007791 | 5/1979 | United Kingdom | 285/177 |

Primary Examiner—Dave W. Arola
Attorney, Agent, or Firm—Harness, Dickey & Pierce

[57] ABSTRACT

A standard pipe coupling is formed of two, semi-circular segments that are bolted together to form a circular casing which surrounds the adjacent, axially aligned, end portions of two pipes to be connected. The casing is U-shaped in cross-section to form an exterior base and radially inwardly directed legs which are of substantially equal length. The radially inner edge portions of the legs form continuous, annular, narrow tenons which normally fit into annular grooves formed in the exterior surfaces of the pipes for interconnecting the casing and substantially equal diameter pipes. A diameter reducing insert comprising a flat, thin, segmented ring whose outer peripheral edge is formed with a continuous groove is arranged coplanar with one of the legs, and with its groove receiving the tenon of that leg. The inner peripheral edge of the insert ring forms a tenon which is substantially the same shape and width as, and is aligned radially inwardly of, and coplanar with, the tenon of its leg for fitting within a groove of a smaller diameter pipe. Thus, a predetermined size casing can be used to couple a corresponding, predetermined diameter large pipe to a variety of different size, smaller diameter pipes by selecting an inert whose inner peripheral edge is matched to the size of the particular diameter small size pipe selected.

11 Claims, 2 Drawing Sheets

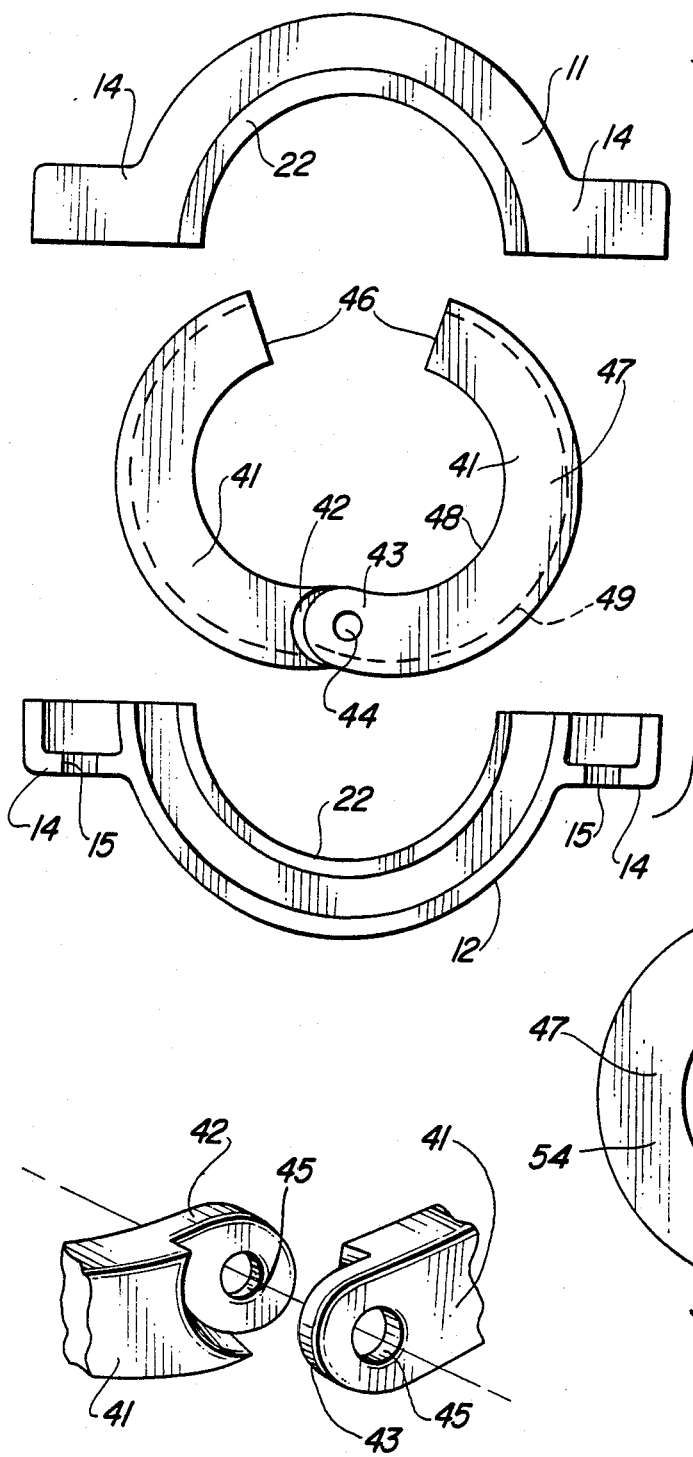
Fig-8
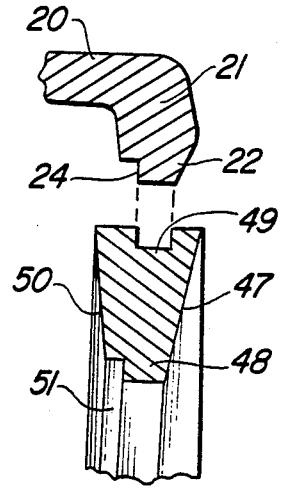
Fig-9
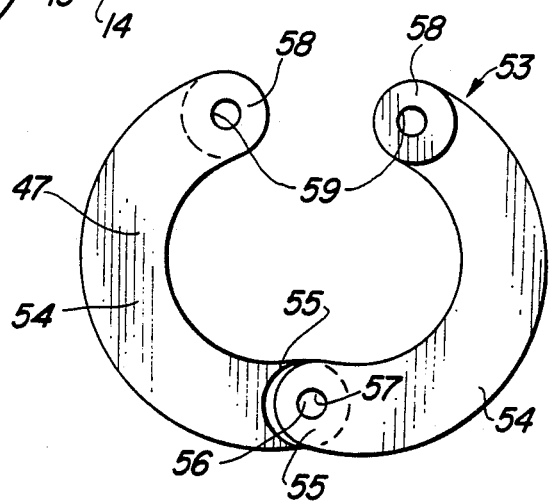
Fig-10
Fig-11

PIPE COUPLING REDUCING INSERT

BACKGROUND OF INVENTION

This invention relates to a coupling for connecting pipes provided with exterior connection grooves. More particularly, this invention relates to an improvement by which a standard or conventional coupling, which is normally utilized to couple pipes of equal diameter, may be used to couple one pipe, which is of the diameter for which the coupling is intended, to a smaller diameter pipe, by utilizing a changeable insert whose size is matched to the smaller diameter pipe.

It is conventional to connect adjacent ends of axially aligned pipes by means of a circular shaped coupling which encircles the adjacent pipe ends. Usually, that type of coupling is formed of two semi-circular segments which are bolted together to form the complete circle. The couplings segments are of a U-shaped cross-section to provide an annular, inwardly opening channel. Each of the ends of the legs that define the groove forms a key or tenon which fits into a groove formed in the surfaces of each of the pipes. A suitable gasket, arranged within the annular channel defined by the coupling segments, serves to seal the joint formed by the coupling and the adjacent pipe ends.

This type of coupling is normally used where pipes are to be connected together with some degree of flexibility in the joint. This flexibility or the ability of the pipe ends to move slightly, relative to each other, results from the relatively loosely interfitting coupling leg tenons and the pipe grooves and the resilient gasket which seals the pipe ends within the coupling.

In the type of coupling described, the coupling channel forming legs are usually of the same length, measured radially inwardly, so as to couple pipes of equal diameter. Thus, plumbing contractors and suppliers, must stock a substantial number of different diameter couplings so that they are readily available for coupling various diameter pipes which may be used in a particular plumbing installation.

In cases where it is necessary to couple a larger diameter pipe to a smaller diameter pipe, the same type of coupling is used. However, here, the coupling U-shaped channel is formed with legs of unequal length. That is, one leg is shorter than the other, measured in the radially inward direction. This permits the shorter leg to closely encircle the larger diameter pipe and the longer leg to closely encircle the smaller diameter pipe. An example of this type of coupling is disclosed in U.S. Pat. No. 3,680,894 issued Aug. 1, 1972 to Young for "Joints Between Pipes of Different Diameters and Couplings and Gaskets for Same."

Because of the wide variation in diameters of larger and smaller couple pipes which may be found in different plumbing installations, it is necessary for plumbing contractors and their supplies to stock a very large inventory of couplings having different length legs to couple different diameter pipes. By way of example, it may be desirable to couple a 6 inch O.D. pipe to a 4 inch O.D. at one point; a 6 inch O.D. pipe to a 3½ diameter pipe elsewhere; and a 6 inch O.D. pipe to a 2½ inch O.D. in another place, etc. Thus, it can be seen that a single diameter large pipe may be coupled to a wide variety of diameters of smaller pipes. This necessitates having available a series of couplings for that purpose. Likewise, since the larger diameter pipes may also vary, the number of large to small diameter couplings are multiplied. That is in addition to the need for an inventory of couplings for connecting pipes of the same O.D., e.g. for connecting a 6 inch O.D. pipe to another 6 inch O.D. pipe.

Couplings of this type are generally formed by casting molten metal either in sand molds, using patterns, or in permanent molds. In either event, it is necessary for the manufacturer to inventory a large number of patterns or permanent molds to handle the wide variety of size couplings needed for connecting the wide variety of different diameter large and small pipes that may be connected together in installations. Thus, this invention concerns an improvement by which standard couplings that are intended for connecting equal diameter pipes may be inexpensively and easily converted for coupling different size pipes so that it is unnecessary to inventory couplings for connecting pipes of different diameters.

SUMMARY OF INVENTION

This invention relates to providing a changeable insert for utilizing standard or conventional circular couplings formed of U-shaped cross-section casings having legs of equal length which are designed for coupling equal diameter pipes, for connecting pipes of two different diameters. That is, a larger diameter pipe, which the coupling is intended to fit, may be coupled to a choice of different size smaller pipes by means of such a changeable insert. The insert comprises a flat, segmented ring having an outer edge surface provided with a groove which simulates the outer, grooved surface of a pipe for which a particular coupling is intended, and an inner edge which simulates the key or tenon of the key of the coupling. Thus, a number of rings of the same outside dimension, but of different inside dimensions, can be inventoried for use with one particular size coupling casing. Since the same coupling casing must be inventoried for coupling pipes of the same size, it is also available to couple two different diameter pipes when an insert is applied. Hence, a relatively small number of single size coupling casings can be inventoried, each of a size to connect two pipes of a single diameter, and dual size couplings casings can be discontinued.

The invention contemplates the insert ring being formed of two flat, thin, semi-circular segments which are pivotally connected together at adjacent ends so that they may be swung open for applying around a pipe and then swung closed for closely encircling the pipe an engaging the pipe groove. Thereafter, a conventional coupling, having equal length legs and formed of a pair of segments, may be mounted around the ring. One of the coupling leg tenons is inserted within the exterior groove of the ring and the opposite leg tenon is inserted in the groove in the larger pipe for which the particular casing was designed. Then, the casing segments may be bolted together in the conventional manner. This includes arranging a resilient gasket around the adjacent pipe ends and within the casing for sealing the joint and providing the desired joint flexibility.

Another object of this invention is to provide a size changing insert for a conventional grooved pipe type of coupling, which insert is automatically properly located for interlocking with its adjacent pipe groove and with its coupling casing leg. The insert is essentially "fool proof" in that it can fit within either of the two legs of the coupling casing and will automatically form an accurately located extension of the leg for fitting into the pipe groove.

A further object of this invention is to provide a coupling assembly by which a conventional coupling casing designed for coupling pipes of equal diameter may be used to couple pipes of different diameters which very little additional labor or time required. That is, when two different size pipes are normally coupled together, using a conventional coupling casing having two different length legs for interlocking with the two pipes, considerable care and time is required for properly engaging the coupling casing within the grooves of the pipes. The insert of the invention reduces the time and effort required to perform the coupling operation.

Still a further object of this invention is to permit a substantial reduction in the number and types of casing, patterns and molds needed to provide the variety of couplings that are utilized in the field for joining different size pipes. Thus, the number of different size casings required and the number of patterns and molds are substantially reduced by utilizing interchangeable, different size inserts with standard size coupling casings. Since, the inserts are relatively inexpensive and much easier to store and transport than coupling casings, the over-all expense is substantially reduced.

These and other objects of this invention will become apparent upon reading the following description, of which the attached drawings form a part.

DESCRIPTION OF DRAWINGS

FIG. 8 is an elevational view showing the coupling casing disassembled with the insert ring pivoted into an open position.

FIG. 9 illustrates a fragmentary, cross-sectional view of a modified insert ring arranged in alignment with the adjacent coupling casing leg.

FIG. 10 is a perspective, fragmentary view of the overlapping, relatively pivotable end portions of the insert ring segments.

FIG. 11 illustrates a modified insert ring in an open pivoted position.

DETAILED DESCRIPTION

Figure 5:
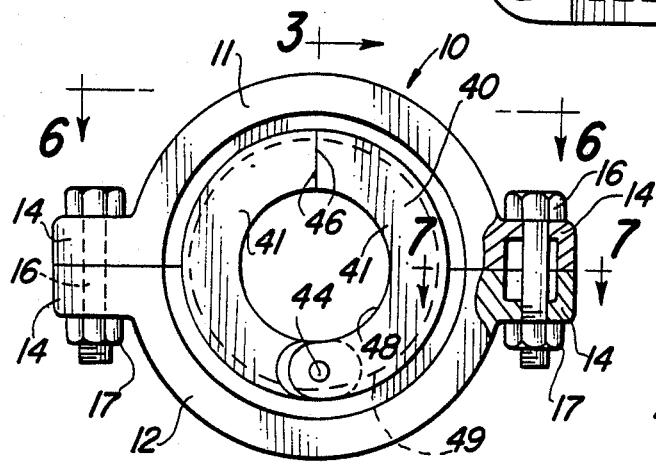
FIG. 5 is an elevational view of the coupling with the insert secured therein.
Figure 7:
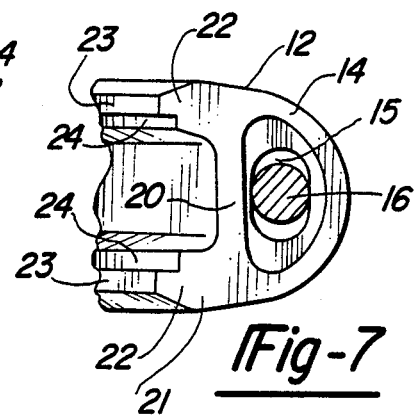
FIG. 7 is enlarged, fragmentary view of one of the coupling segment fastening lugs, with a bolt extending therethrough, taken as if in the direction of arrows 7—7 of FIG. 5.

FIG. 5 illustrates a coupling having a circular casing 10 formed of two semi-circular casing segments 11 and 12. Each of the segments has integral, hollow, fastening lugs, with the lugs of one segment overlapping and being aligned with the lugs of the other segment. Each of the lugs is provided with roughly elliptically shaped holes 15 through which bolts 16 are inserted. Nuts 17 secure the bolts in the aligned lugs to fasten the two segments together and, therefore, to form the circular shape.

The casing is U-shaped in cross-section to provide an annular channel. The channel is formed by a base 20 and integral, radially inwardly extending legs 21 of equal length. The free, inner peripheral edges of the legs form keys or tenons 22 which terminate in flat, narrow, band-like annular surfaces 23. In addition, the inside corners of the tenons, are recessed by rabbit-like grooves 24.

Figure 1:
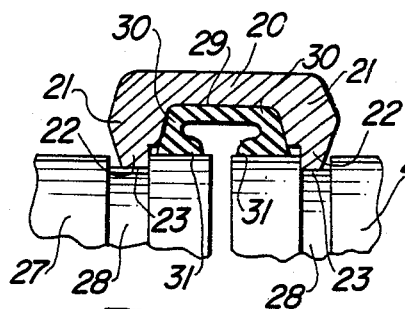
FIG. 1 is a fragmentary, partially cross-sectional view showing a prior art coupling casing mounted upon a pair of adjacent ends of equal diameter pipes.

As illustrated in FIG. 1, the adjacent ends of a pair of co-axially arranged pipes 27 and 27a, which are of the same diameter, are encircled by the casing. The pipes each have an exterior, outwardly opening groove 28 into which the tenons or keys of the legs are inserted. A U-shaped, resilient, rubber-like gasket 29 is inserted within the annular channel of the casing and encircles the end portions of the pipes. The gasket is provided with equal length legs 30 which terminate in widened lips 31 arranged in engagement with the pipe ends.

The exterior pipe grooves 28 may be cut into the pipes or may be rolled into the pipes using conventional equipment which is available for that purpose. With the casing segment tenons arranged within the pipe grooves, the pipes are held in axially aligned position relative to each other. The joint formed by the adjacent pipe ends and the coupling, is sealed by the gasket which encircles the adjacent pipe ends. Fluid flowing through the pipes enters the channel-like gasket and increases the sealing pressure of the gasket against the pipes and interior of the casing.

The coupling which is described above is conventional and is manufactured in numerous sizes to accommodate a variety of different diameter pipes. As mentioned, this form of coupling is intended for use in connecting two pipes of substantially identical outside diameter.

Figure 2:
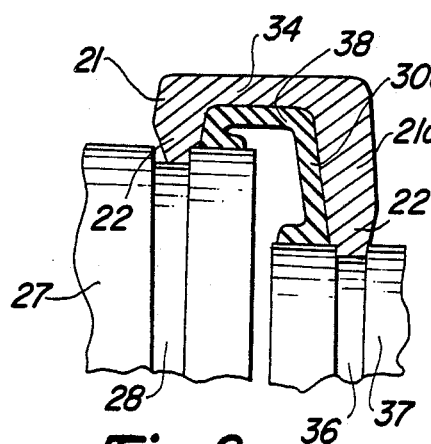
FIG. 2 is a fragmentary, partially cross-sectional view of a prior art coupling casing having different length, radially inwardly directed, legs for mounting upon two different diameter pipes.

FIG. 2 illustrate a conventional coupling 34, which is similar to the previously described coupling, but is intended to connect two pipes of different diameters. Thus, one of the two annular channel legs 21a considerably longer in the radial direction, than the other leg 21. The longer leg 21a is similar to the shorter leg 21 in all respects except for its length. Thus, the tenon of the longer leg is inserted in a groove 36 formed in a smaller diameter pipe 37. Because the coupling casing is formed with a longer and a shorter leg for coupling a larger and a smaller diameter pipe, the gasket 38 is also provided with a longer leg 30a for encircling and seating against the surface of the smaller pipe 37.

Since there are numerous conventional size pipes used in plumbing operations, it is necessary to have available a large selection of dual size couplings which are formed, similar to the coupling of FIG. 2, with shorter and longer legs to couple two different size pipes. By way of example, the shorter leg, that is, with the larger diameter opening, may be formed to receive a 4 inch outside diameter pipe. The longer leg, that is, with the smaller opening, may be sized to receive a 3 inch diameter pipe. Another coupling may receive a 4 inch outside diameter pipe and a 2½ inch outside diameter smaller pipe. Yet another coupling may receive a 4 inch larger pipe and a 2 inch smaller pipe, etc. As can be seen, a separate coupling is needed for each one of these different size pairs of pipes. Thus, numerous couplings must be inventoried and carried to accommodate each of the different sizes encountered in many plumbing installations.

The invention herein relates to the provision of a replaceable insert ring 40 which can be used within a casing that is intended for equal diameter pipes. The ring provides the smaller diameter opening for accommodating smaller diameter pipes. Thus, changing the ring, permits adapting the coupling to different size smaller pipes for any particular size large pipe. If necessary, a second ring may be used in a that particular coupling.

The insert ring 40 is formed of a pair of ring segments 41 which are semi-circular. The rings are formed identically, with each having a reduced thickness end portion shaped so that the two end portions 42 and 43 are overlapped, as illustrated in FIG. 10, and are pivotally connected together by a pivot pin 44 extending through aligned holes 45.

The opposite ends 46 of the ring segments are shaped to abut together so that the ring may be pivoted into a closed circular position or alternatively, may be pivoted into an open position. As illustrated, the ring is preferably thin, and generally flat in configuration. Its opposite, side faces 47 are tapered from its outer peripheral edge toward the inner peripheral edge. This provides an inner edge portion that forms a key or tenon 48 which corresponds in size and shape to the key or tenon of the casing segments legs. The exterior, peripheral surface of the ring is provided with a groove 49 which simulates the exterior pipe groove 28 that receives the key or tenon 22 of the casing leg 21. Thus, the groove 49 formed in the outer surface of the ring is substantially coplanar or radially aligned with the key or tenon 48 formed on the inner edge of the ring.

In operation, the plumber selects a standard or conventional coupling of the type intended to connect two equal diameter pipes, such as illustrated in FIG. 1. In this instance, the diameter of the circle formed by the inner edges of the casing legs is selected to correspond to the larger pipe to be coupled. Then, the plumber selects, from among an available assortment of inserts, an insert fitted to that particular coupling casing and having an inner opening which matches the smaller pipe diameter. At that point, the plumber pivots the ring segments to open the ring, as illustrated in FIG. 9. Then, he applies the ring around the smaller pipe with the ring tenon fitted into the smaller pipe groove 28a. Next, the ring segments are pivoted into the circular shape where the ring forms a continuous flange around the smaller pipe.

Either before or after installation of the ring, the plumber installs a gasket, around the pipe ends. Next, the two halves of the coupling casing are applied around the pipe ends, gasket and ring. This is a relatively fast and simple task which is actually easier and faster than applying a dual size coupling casing, of the type shown in FIG. 4, directly upon a pair of adjacent large and small pipe ends.

Figures 3, 4:
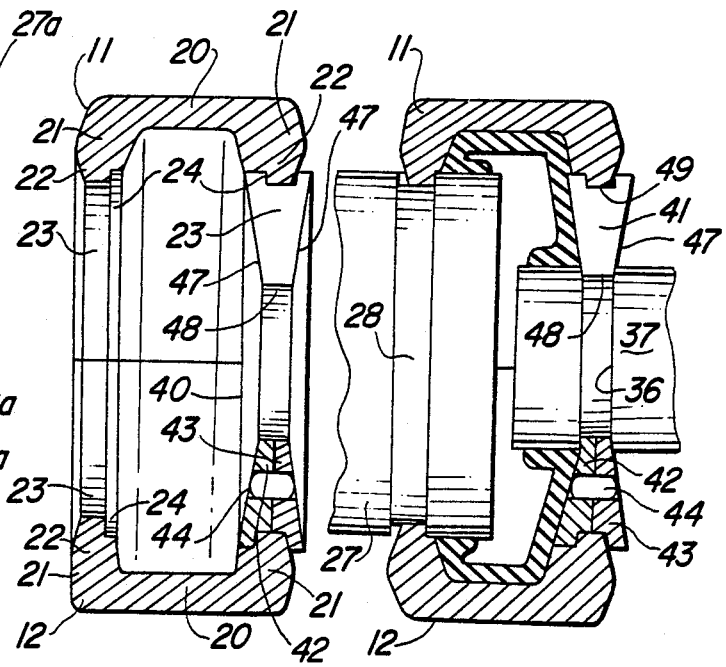
FIG. 3 is a cross-sectional view of an insert mounted within a casing, and taken as if in the direction of arrows 3—3 of FIG. 5.
FIG. 4 is a cross-sectional view similar to FIG. 3, but showing the adjacent ends of a larger diameter pipe and a smaller diameter pipe, surrounded by a gasket, coupled together by the coupling.
Figure 6:
FIG. 6 is a plan view of the coupling, without the insert, taken as if in the direction of arrows 6—6.

Finally, the bolts which extend through the casing segment lugs are tightened so that the casing is clamped around the pipes, ring and gasket. FIG. 4 illustrates, in cross-section, the casing, ring and gasket assembled around the adjacent ends of a large and small pipe.

The key or tenon inner edge portion of the ring is automatically aligned with the pre-existing key or tenon portion of the coupling leg. Hence, the assembly is "fool proof" in that the ring may be applied to either of the two legs of the casing and, the ring will automatically be properly located.

For some installations, it may be desirable to provide an edge rabbit-like groove or recess similar to that found in the casing leg ends. Hence, FIG. 9 illustrates a modified ring 50 which is provided with a rabbit-like groove 51 that is similar in configuration to the conventional groove or recess 24 found in the inner corners of the legs 21.

FIG. 11 illustrates a modified ring 53 whose ring segments 54 are provided with thinner, overlapped end portions 55 which are pivotally connected together by a pin 56 extending through aligned holes 57. The opposite ends of the ring segments may also be provided with similar overlapping, flat, or end portions 58. Likewise, pin receiving holes 59 may be formed in these opposite flats. A pin or screw or bolt may be inserted through the aligned holes 59 to maintain the ring in position while the plumber is working.

As can be seen, with the use of the insert, a plumbing contractor or a supply facility can keep a large number of assorted size rings on hand because the rings are small, flat, and relatively inexpensive. In addition, a number of casings, of the type intended to couple similar size pipes, can be kept on hand. Thus, the correct size insert may be selected and utilized with the correct size casing to couple larger and smaller diameter pipes.

This invention may be further developed within the scope of the following claims. Accordingly, it is desired that the foregoing specification be read as illustrative of an operative device and not in a strictly limiting sense.

Having fully described at least one operative embodiment of this invention, I now claim:

1. A pipe coupling reducing insert for a standard pipe coupling formed of two semi-circular segments that are normally fastened together to provide a circular casing which surrounds the adjacent, axially aligned, end portions of a pair of pipes which are of substantially equal, predetermined size diameters, with the casing being U-shaped in cross-section to form a radially inwardly opening, annular channel having an exterior base and radially inwardly directed legs of substantially equal length, and whose inner, free peripheral edges form continuous, annular tenons that normally fit into and interlock with continuous grooves formed on the exterior surfaces of the adjacent pipe end portions, said insert comprising:

a circular ring formed of separable segments and having an outer peripheral edge which is provided with an exterior, continuous groove shaped to receive the tenon of one of the casing legs, and an inner peripheral edge portion which forms an annular ring tenon similar to such casing leg tenon;

said ring being normally located in coplanar relationship with said one casing leg for encircling a pipe of a smaller diameter than the predetermined size pipe, and with its tenon being substantially coplanar with the surrounding tenon of said casing leg;

and with the ring inner diameter being pre-selected to correspond to the diameter of a particular, pre-selected, smaller diameter pipe to be coupled to a larger diameter pipe which is interlocked with the opposite casing leg, so that a predetermined size, standard casing may be used to couple a particular size, large diameter pipe for which that casing is intended, to a variety of smaller size diameter pipes by pre-selecting an insert which matches the size of that smaller diameter pipe.

2. A pipe coupling reducing insert as defined in claim 1, and said ring comprising a pair of semi-circular segments having adjacent end portions that are pivotally connected together and opposite, free end portions arranged close together, so that the ring may be opened for encircling a pipe and then closed into its circular shape so that the ring may be encircled by the casing.

3. A pipe coupling as defined in claim 2, and with the ring segments having pivotally connected end portions which overlap each other and which are secured together by a pivot pin about which they may be pivoted.

4. A pipe coupling as defined in claim 3, and with the opposite free ends of the ring segments being substantially flat and abutted together end to end to form the ring shape.

5. A pipe coupling as defined in claim 3, and with the opposite free ends of the ring segments having overlapped end portions which may be separated.

6. A pipe coupling as defined in claim 1, and with said ring having opposite side faces that taper towards each other from the outer peripheral, grooved edge of the ring towards the ring inner, tenon forming, peripheral edge, so that said inner peripheral edge is about the same width, in the axial direction, as the width of, and is radially aligned with, the tenon of said surrounding casing leg.

7. A pipe coupling as defined in claim 6, and with said ring segments having adjacent end portions that are pivotally connected together and opposite, normally free end portions which are located closely adjacent each other, so that the ring segments may be temporarily pivoted apart for arranging the ring around a pipe and, thereafter pivoted together for mounting the casing around the ring.

8. A pipe coupling as defined in claim 7, and including said inner peripheral, tenon forming ring edge portion being formed with a continuous, annular, rabbit-like recess which opens into one of its faces and its peripheral edge which matches and is radially aligned with a similar recess formed on the casing leg with which the ring is aligned.

9. A coupling assembly for coupling together the adjacent ends of a pair of axially aligned pipes, wherein one pipe is of a particular predetermined large diameter and the other pipe is selected from among a variety of different size, smaller diameters, comprising:

a U-shaped in cross-section casing formed of a pair of semi-circular segments which are fastened together to form a generally circular shape of a size to surround the edges of the pipes to be coupled, and with the casing having an outer annular base and radially inwardly directed legs of substantially equal length;

the free, peripheral, inner edges of the legs forming substantially continuous tenons of a diameter selected to fit into external grooves formed in the external surface of a larger diameter pipe;

a circular ring formed of separable segments arranged within the casing in coplanar relationship with one of the casing legs;

said ring having an external groove formed in its peripheral edge, which groove receive the tenon formed by said one leg, and having an inner peripheral edge portion which matches and is axially and radially aligned with said one leg tenon, and is of a size selected to fit within a corresponding groove formed in a pipe of a selected, smaller diameter;

wherein the smaller pipe may be selected from a variety of smaller diameter pipes and coupled by selecting a ring which has an external peripheral edge that matches the casing leg tenon and an inner peripheral edge that matches the particular smaller diameter pipe selected.

10. A coupling assembly as defined in claim 9, and including said ring being substantially flat and thin and having opposite said side faces, with said faces tapering towards each other from the outer peripheral edge of the ring towards its inner peripheral edge to form the ring inner edge of the same thickness as the width of the tenon formed on its casing leg.

11. A coupling assembling as defined in claim 10, and said ring segments having adjacent end portions that are pivotally connected together and opposite end portions that are normally adjacent, but are separable so that the ring segments may be pivoted apart for mounting upon a pipe and thereafter may be returned to the ring configuration for closely encircling the pipe with its inner edge tenon positioned with the groove formed in that pipe.

* * * * *